United States Patent
Yamamoto

(10) Patent No.: US 9,113,028 B2
(45) Date of Patent: Aug. 18, 2015

(54) IMAGE PROCESSING APPARATUS CAPABLE OF LOOP PLAYBACK OF VIDEO, METHOD OF CONTROLLING THE SAME, AND STORAGE MEDIUM

(71) Applicant: CANON KABUSHIKI KAISHA, Tokyo (JP)

(72) Inventor: Jun Yamamoto, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 11 days.

(21) Appl. No.: 13/722,086

(22) Filed: Dec. 20, 2012

(65) Prior Publication Data
US 2013/0163955 A1    Jun. 27, 2013

(30) Foreign Application Priority Data
Dec. 27, 2011   (JP) .................... 2011-285964

(51) Int. Cl.
| | |
|---|---|
| H04N 5/85 | (2006.01) |
| H04N 9/12 | (2006.01) |
| H04N 5/783 | (2006.01) |
| H04N 21/472 | (2011.01) |
| H04N 1/00 | (2006.01) |

(52) U.S. Cl.
CPC ............ *H04N 9/12* (2013.01); *H04N 1/00408* (2013.01); *H04N 5/783* (2013.01); *H04N 21/47217* (2013.01); *H04N 1/00244* (2013.01); *H04N 2201/0039* (2013.01); *H04N 2201/0094* (2013.01)

(58) Field of Classification Search
USPC .................................................. 386/343, 239
See application file for complete search history.

(56) References Cited

U.S. PATENT DOCUMENTS

| | | | |
|---|---|---|---|
| 2005/0259959 A1* | 11/2005 | Nagao et al. ................ | 386/69 |
| 2008/0278753 A1* | 11/2008 | Oda et al. .................... | 358/1.15 |
| 2009/0154890 A1* | 6/2009 | Nakamura et al. ........... | 386/46 |
| 2011/0033172 A1* | 2/2011 | Ando et al. ................. | 386/355 |
| 2011/0167347 A1* | 7/2011 | Joo et al. ..................... | 715/716 |

FOREIGN PATENT DOCUMENTS

| | | |
|---|---|---|
| JP | 08-069223 A | 3/1996 |
| JP | 2003-333463 A | 11/2003 |
| WO | 2007-029489 A1 | 3/2007 |

* cited by examiner

*Primary Examiner* — Thai Tran
*Assistant Examiner* — Nien-Ru Yang
(74) *Attorney, Agent, or Firm* — Rossi, Kimms & McDowell LLP

(57) ABSTRACT

An image processing apparatus capable of executing loop playback of a video from a start position desired by a system user without requiring setting thereof in advance. A button displayed on a console section shifts a playback position of the video to a desired position according to an operation by a user. A comparative determination section determines whether or not a shifted playback position shifted backward. When the shifted playback position shifted backward, a video controller stores the shifted playback position as a start position of a loop playback section and the playback position before being shifted as an end position of the same, and gives an instruction for controlling loop playback of the loop playback section defined by the start position and the end position.

14 Claims, 11 Drawing Sheets

IMAGE PROCESSING APPARATUS CAPABLE OF LOOP PLAYBACK OF VIDEO, METHOD OF CONTROLLING THE SAME, AND STORAGE MEDIUM

BACKGROUND OF THE INVENTION

1. Field of the Invention

The present invention relates to an image processing apparatus, a method of controlling the same, and a storage medium, and more particularly to a technique for displaying a maintenance video about paper jam removal, toner change, etc., in an image processing apparatus.

2. Description of the Related Art

Japanese Patent Laid-Open Publication No. H8-69223 proposes a technique of instructing a maintenance procedure using a video when a maintenance work, such as paper jam removal and toner change, is necessary, which enables a system user to easily perform maintenance.

Japanese Patent Laid-Open Publication No. 2003-333463 proposes a playback device including a unit that resumes playback from a frame before a desired time period, and a unit that sets the number of playback loops, and also proposes a unit capable of setting a point in a video from which loop playback is desired to be executed.

Domestic re-publication of PCT international application WO2007/029489 proposes a unit that automatically calculates, only by pressing a replay key, a start position of a scene of a video, based on information on importance or the like of scenes in the video, and executes playback of the scene.

However, when a maintenance procedure is instructed by video as proposed in Japanese Patent Laid-Open Publication No. H8-69223, it is necessary to perform complicated operations of paper jam removal or the like, simultaneously while watching the maintenance video. Therefore, if it takes time to understand an instructed part of the maintenance procedure and operations for the instructed part cannot be executed within an assigned time period, the maintenance video proceeds to a next part corresponding to a next part of the procedure. To overcome this problem, if a method of setting a section for loop playback in a video as proposed in Japanese Patent Laid-Open Publication No. 2003-333463 is adopted, it is just possible to execute loop playback of a video portion corresponding to a part of the maintenance procedure for which it takes more time to complete operations than assigned.

However, even though a system user causes the video to go back by a value set before executing a maintenance work or a value registered in advance for replay, the video does not necessarily go back to a position from which the system user desired to restart the playback. Further, since the unit proposed in Domestic re-publication of PCT international application WO2007/029489 determines a restart position automatically from information on the importance of scenes or the like, the video does not necessarily go back to a position from which the system user desires to restart playback.

SUMMARY OF THE INVENTION

The present invention provides an image processing apparatus which is capable of executing loop playback of a video from a start position desired by a system user without requiring setting thereof in advance, and a method of controlling the same, and a storage medium.

In a first aspect of the present invention, there is provided an image processing apparatus capable of playing a video comprising a shift unit configured to shift a playback position of the video to a desired position according to an operation by a user, a determination unit configured to determine whether or not a playback position after being shifted by the shift unit is a position shifted backward from the playback position before being shifted, and an operation unit configured to, when the determination unit determines that the playback position after being shifted is a position shifted backward from the playback position before being shifted, store the playback position after being shifted as a start position of a loop playback section, store the playback position before being shifted as an end position of the loop playback section, and give an instruction for controlling loop playback of the loop playback section defined by the start position and the end position.

In a second aspect of the present invention, there is provided an image processing apparatus capable of playing a video comprising a shift unit configured to shift a playback position of the video to a desired position according to an operation by a user, a determination unit configured to determine whether or not the playback position after being shifted by the shift unit is a position shifted backward from the playback position before being shifted, a waiting unit configured to, when the determination unit determines that the playback position after being shifted is a position shifted backward from the playback position before being shifted, wait for a predetermined time period to elapse, and an operation unit configured to, when the playback position has not been shifted by the shift unit until the predetermined time period elapses, set the playback position after being shifted as a start position of a loop playback section, set the playback position before being shifted as an end position of the loop playback section, and give an instruction for controlling loop playback of the loop playback section defined by the start position and the end position.

In a third aspect of the present invention, there is provided an image processing apparatus capable of playing a video comprising a shift unit configured to shift a playback position of the video to a desired position according to an operation by a user, a determination unit configured to determine whether or not the playback position after being shifted by the shift unit is a position shifted backward from the playback position before being shifted, a storing unit configured to, when the determination unit determines that the playback position after being shifted is a position shifted backward from the playback position before being shifted, store a chapter position within a predetermined range from the playback position before being shifted as an end position of a loop playback section, and a chapter position within a predetermined range from the playback position after being shifted as a start position of the loop playback section, and an operation unit configured to give an instruction for controlling the loop playback section defined by the chapter positions stored as the start position and the end position, respectively, by the storing unit.

In a fourth aspect of the present invention, there is provided a method of controlling an image processing apparatus including a playback unit for playing a video, and a shift unit for shifting a playback position of the video to a desired position according to an operation by a user, comprising determining whether or not a playback position after being shifted by the shift unit is a position shifted backward from the playback position before being shifted, and storing the playback position after being shifted as a start position of a loop playback section, storing the playback position before being shifted as an end position of the loop playback section, and giving an instruction for controlling loop playback of the loop playback section defined by the start position and the end position, when the determining determines that the playback position after being shifted is a position shifted backward from the playback position before being shifted.

In a fifth aspect of the present invention, there is provided a method of controlling an image processing apparatus including a playback unit for playing a video, and a shift unit for shifting a playback position of the video to a desired position according to an operation by a user, comprising determining whether or not the playback position after being shifted by the shift unit is a position shifted backward from the playback position before being shifted, waiting, when the determining determines that the playback position after being shifted is a position shifted backward from the playback position before being shifted, for a predetermined time period to elapse, and setting the playback position after being shifted as a start position of a loop playback section, setting the playback position before being shifted as an end position of the loop playback section, and giving an instruction for controlling loop playback of the loop playback section defined by the start position and the end position, when the playback position has not been shifted by the shift unit until the predetermined time period elapses.

In a sixth aspect of the present invention, there is provided a method of controlling an image processing apparatus including a playback unit for playing a video, and a shift unit for shifting a playback position of the video to a desired position according to an operation by a user, comprising determining whether or not the playback position after being shifted by the shift unit is a position shifted backward from the playback position before being shifted, storing, when the determining determines that the playback position after being shifted is a position shifted backward from the playback position before being shifted, a chapter position within a predetermined range from the playback position before being shifted as an end position of a loop playback section, and a chapter position within a predetermined range from the playback position after being shifted as a start position of the loop playback section, and giving an instruction for controlling the loop playback section defined by the chapter positions stored as the start position and the end position, respectively, by the storing.

In a seventh aspect of the present invention, there is provided a computer-readable storage medium storing a computer-executable program causing a computer provided in an image processing apparatus including a playback unit for playing a video, and a shift unit for shifting a playback position of the video to a desired position according to an operation by a user, to execute a method of controlling the image processing apparatus, wherein the method comprises determining whether or not a playback position after being shifted by the shift unit is a position shifted backward from the playback position before being shifted, and storing the playback position after being shifted as a start position of a loop playback section, storing the playback position before being shifted as an end position of the loop playback section, and giving an instruction for controlling loop playback of the loop playback section defined by the start position and the end position, when the determining determines that the playback position after being shifted is a position shifted backward from the playback position before being shifted.

In a eighth aspect of the present invention, there is provided a computer-readable storage medium storing a computer-executable program causing a computer provided in an image processing apparatus including a playback unit for playing a video, and a shift unit for shifting a playback position of the video to a desired position according to an operation by a user, to execute a method of controlling the image processing apparatus, wherein the method comprises determining whether or not the playback position after being shifted by the shift unit is a position shifted backward from the playback position before being shifted, waiting, when the determining determines that the playback position after being shifted is a position shifted backward from the playback position before being shifted, for a predetermined time period to elapse, and setting the playback position after being shifted as a start position of a loop playback section, setting the playback position before being shifted as an end position of the loop playback section, and giving an instruction for controlling loop playback of the loop playback section defined by the start position and the end position, when the playback position has not been shifted by the shift unit until the predetermined time period elapses.

In a ninth aspect of the present invention, there is provided a computer-readable storage medium storing a computer-executable program causing a computer provided in an image processing apparatus including a playback unit for playing a video, and a shift unit for shifting a playback position of the video to a desired position according to an operation by a user, to execute a method of controlling the image processing apparatus, wherein the method comprises determining whether or not the playback position after being shifted by the shift unit is a position shifted backward from the playback position before being shifted, storing, when the determining determines that the playback position after being shifted is a position shifted backward from the playback position before being shifted, a chapter position within a predetermined range from the playback position before being shifted as an end position of a loop playback section, and a chapter position within a predetermined range from the playback position after being shifted as a start position of the loop playback section, and giving an instruction for controlling the loop playback section defined by the chapter positions stored as the start position and the end position, respectively, by the storing.

According to the present invention, it is possible to execute loop playback of a video from a restart position from which a system user desires to restart playback. Therefore, it is possible to improve working efficiency of maintenance which requires complicated operations.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
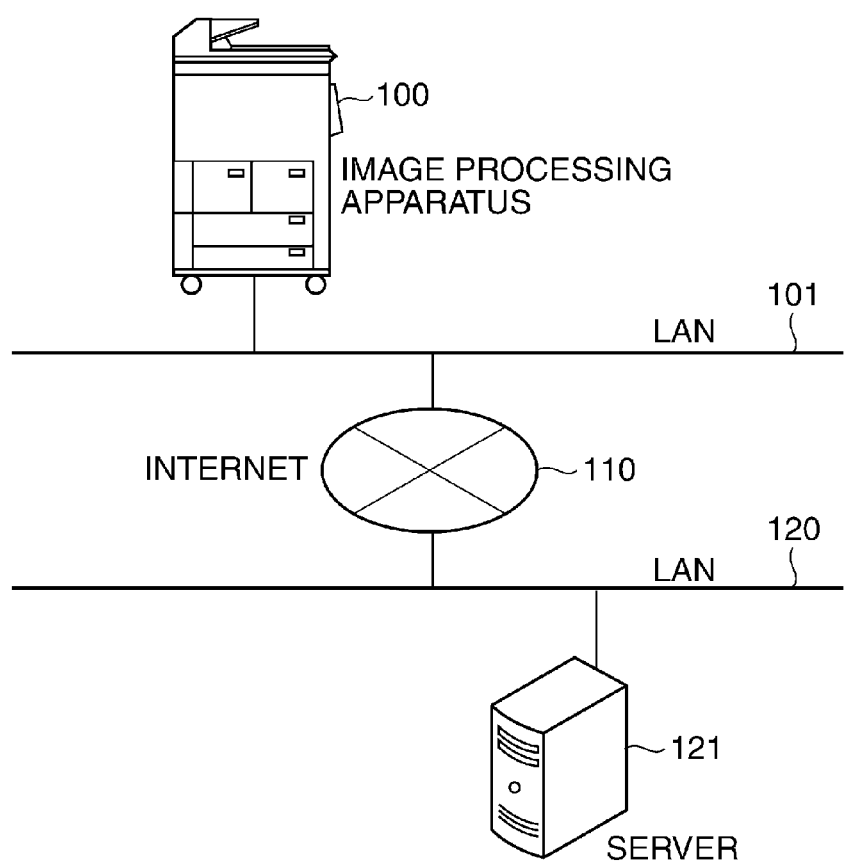
FIG. 1 is a view of an example of a network environment including an image processing apparatus according to a first embodiment of the present invention.

FIG. 1 is a view of an example of a network environment including an image processing apparatus according to an embodiment of the present invention.

In FIG. 1, the image processing apparatus 100 is connected to the Internet 110 via a LAN 101. A server 121 is an information processing apparatus comprising a CPU, a ROM, a RAM, a HDD, and a network interface (none of which are shown). The server 121 is connected to the Internet 110 via a LAN 120 from an internal network interface.

Further, the server 121 can transmit and receive various information to and from other apparatuses via the LAN 120. In the server 121, the CPU executes control programs stored in the ROM, thereby controls the overall operation of the server 121. The RAM in the server 121 serves as a temporary storage area, such as a main memory or a work area of the CPU. The HDD of the server 121 stores various programs, video contents, various information transmitted and received to and from other devices, etc.

Figure 2:
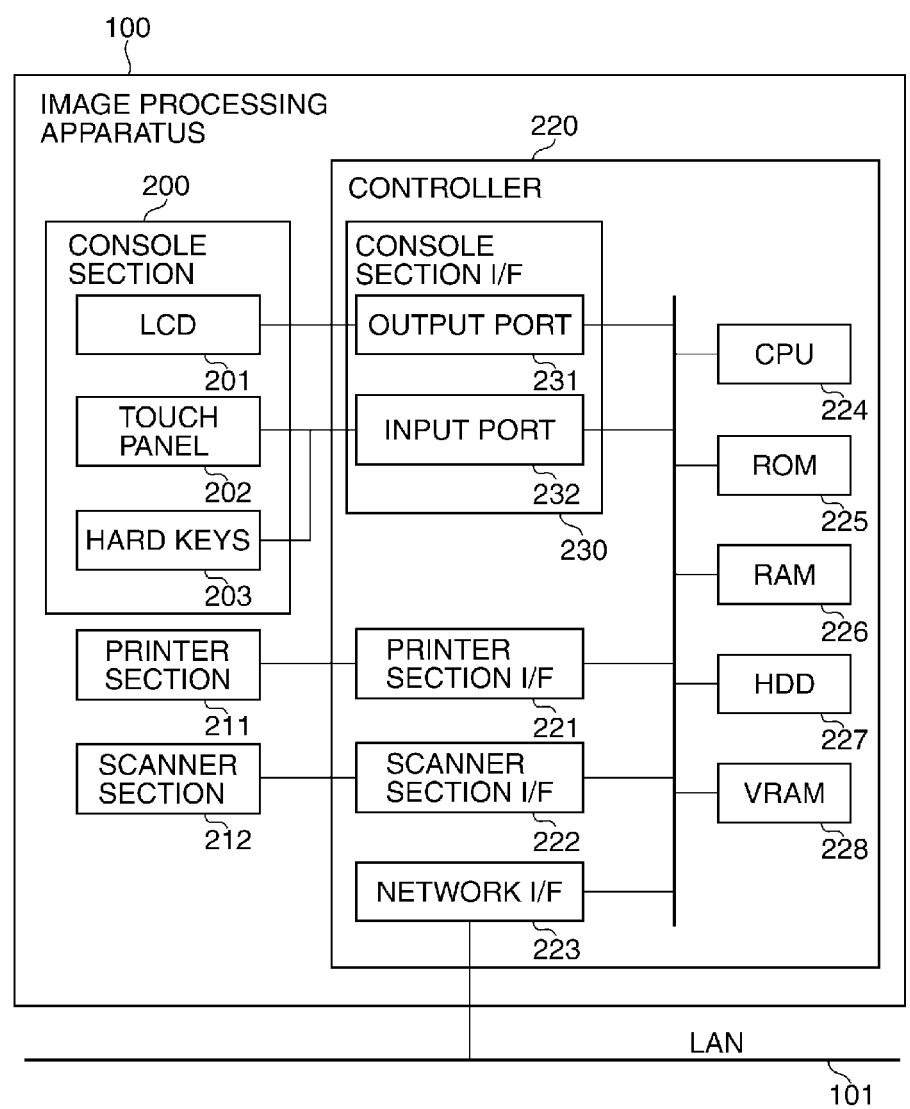
FIG. 2 is a general block diagram of the hardware configuration of the image processing apparatus shown in FIG. 1.

FIG. 2 is a general block diagram of the hardware configuration of the image processing apparatus 100 appearing in FIG. 1.

A controller 220 including a CPU 224 controls the overall operation of the image processing apparatus 100. The CPU 224 reads out control programs stored in a ROM 225 and performs various controls including readout control and transmit control. A RAM 226 serves as a temporary storage area, such as a main memory or a work area of the CPU 224. A HDD 227 stores image data, video contents, various programs, and various information tables. A VRAM 228 is a memory that stores display screen data generated by the CPU 224.

An operating section interface 230 is an interface (I/F) that connects a console section 200 and the controller 220. An output port 231 connects to an LCD 201 of the console section 200 and serves to transfer display screen data stored in the VRAM 228 to the LCD 201. An input port 232 connects a touch panel 202 and hard keys 203 of the console section 200 and serves to convey information input by a system user to the CPU 224.

A printer section interface 221 is an interface that connects the controller 220 and a printer section 211. Image data to be printed by the printer section 211 is transferred from the controller 220 via the printer section interface 221 and is printed on a recording medium by the printer section 211.

A scanner section interface 222 is an interface that connects the controller 220 and a scanner section 212. The scanner section 212 reads an original placed on an original platen glass (not shown) to generate image data, and inputs the generated image data to the controller 220 via the scanner section interface 222.

A network interface 223 is an interface that connects the controller 220 and the LAN 101. The network interface 223 transmits image data and various information to external apparatuses on the LAN 101 and receives various information from the external apparatuses on the LAN 101.

Figure 3:
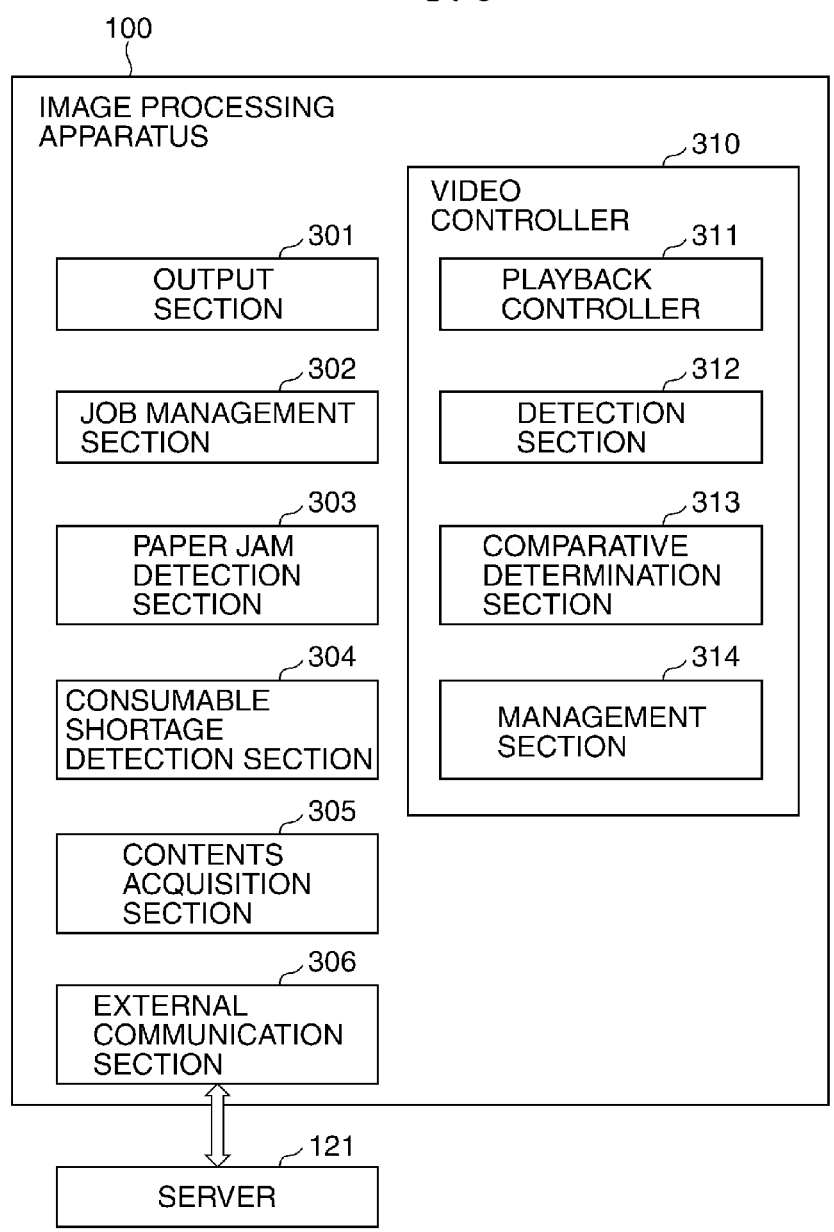
FIG. 3 is a general block diagram of the software configuration of the image processing apparatus.

FIG. 3 is a general block diagram of the software configuration of the image processing apparatus 100.

Each functional section shown in FIG. 3 is realized by the CPU 224 in the image processing apparatus 100 which reads out and executes control programs stored in the ROM 225 or the HDD 227.

The image processing apparatus 100 comprises an output section 301, a job management section 302, a paper jam detection section 303, a consumable shortage detection section 304, a contents acquisition section 305, an external communication section 306, and a video controller 310.

The output section 301 generates a screen to be displayed on the LCD 201 of the console section 200, and causes the screen to be displayed. Further, the output section 301 causes video data processed by the video controller 310 to be displayed on the LCD 201 of the console section 200, for playback.

The job management section 302 stores and manages information on job settings, such as a start time of a job being currently processed, a job type, a document name, the number of sheets to be output, the number of copies to be output, execution or non-execution of stapling, etc. in the RAM 226 or the HDD 227. The job type is intended to mean a kind of job executed by the image processing apparatus 100, e.g. copy, print, transmission, storage, etc.

The paper jam detection section 303 locates a paper jam occurrence location where a paper jam has occurred, within the image processing apparatus 100, and sets a paper jam occurrence flag for the paper jam occurrence location.

The consumable shortage detection section 304 detects a remaining amount of consumables in the image processing apparatus 100. The term "consumables" is intended to mean, e.g. toner, staples, sheets, and the like. Further, the consumable shortage detection section 304 also detects an amount of waste built up within the image processing apparatus 100, such as punch waste, toner waste, etc.

The contents acquisition section 305 acquires video data and various information from the RAM 226 or the HDD 227 of the image processing apparatus 100, or from the external server 121. When acquiring such information from the external server 121, the acquisition is performed via the external communication section 306.

In order to receive video data and various information from the external server 121, the external communication section 306 communicates with the external server 121 via the Internet 110.

The video controller 310 comprises a playback controller 311, a detection section 312, a comparative determination section 313, and a management section 314.

The playback controller 311 performs control on the start of playback, the stop of playback, pause, fast-rewind, fast-forward, loop playback, etc., of a video being processed. The term "loop playback" is intended to mean playback of a section created as a loop in a video currently being played back by setting a start position and an end position of the section.

The detection section 312 detects control information concerning playback of a video, which is input by the system user using the console section 200. For example, the detection section 312 detects control information on the start of playback, the stop of playback, pause, fast-rewind, fast-forward, loop playback, the shift of a playback position, etc., and notifies the detected control information to the playback controller 311 or the comparative determination section 313.

The comparative determination section 313 compares control information concerning the shift of the playback position for fast-rewind, fast-forward, or the like, notified by the detection section 312, and determines whether or not it can be information on the start position of a section for loop playback, the end position of the section for loop playback, and the like.

The management section 314 stores and manages information on the start position of the section for loop playback and the end position of the section for loop playback determined by the comparative determination section 313, a loop state, etc., in the RAM 226 or the HDD 227.

Next, a description will be given of a loop playback button display process for displaying a loop playback button 714 for use in executing loop playback (see FIG. 7), which is executed by the image processing apparatus 100 when shifting a playback position of a maintenance video being played back to a desired position.

Figure 4:
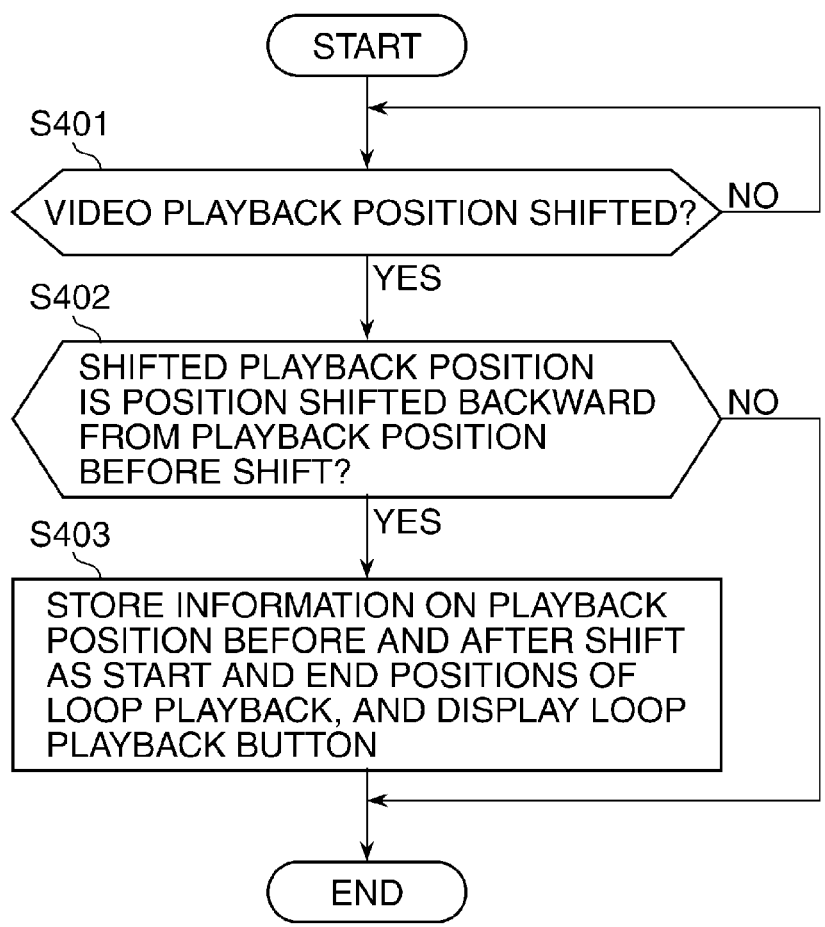
FIG. 4 is a flowchart of a loop playback button display process when a playback position of a maintenance video is shifted, in the first embodiment.

FIG. 4 is a flowchart of the loop playback button display process executed in the first embodiment. Steps appearing in FIG. 4 are realized by execution of a control program by the CPU 224 of the image processing apparatus 100.

When a paper jam is detected by the paper jam detection section 303 or shortage (necessity of replenishment) of consumables is detected by the consumable shortage detection section 304, a video data for showing a maintenance procedure suitable for a case detected by either of them is acquired by the contents acquisition section 305, and is played as a maintenance video. For example, when a paper jam is detected, a video data showing a maintenance procedure for paper jam removal is played, and on the other hand, shortage of consumables is detected, a video data showing a maintenance procedure for replenishing consumables or replacing a consumable unit is played.

In a step S401, upon detection of an event concerning playback control of a maintenance video, the detection section 312 determines whether or not the detected event is a shift of a video playback position by the system user. If it is determined that the detected event is a shift of a video playback position by the system user, the process proceeds to a step S402.

In the step S402, the comparative determination section 313 determines, based on information on a playback position before the shift and a playback position after the shift, whether or not the playback position after the shift is a position shifted backward from the playback position before the shift. If it is determined that the playback position after the shift is not a position shifted backward from the playback position before the shift, the present process is immediately terminated. On the other hand, if it is determined that the playback position after the shift is a position shifted backward from the playback position before the shift, the process proceeds to a step S403.

In the step S403, the management section 314 stores information on the playback position before the shift and the playback position after the shift in the RAM 226 or the HDD 227. At this time, the stored playback position before the shift is stored as an end position of a section for loop playback (a loop end position). On the other hand, the stored playback position after the shift is stored as a start position of the section for loop playback (a loop start position). Further, the playback controller 311 displays the loop playback button 714 as an operation unit for controlling the loop playback of the section from the start position to the end position.

Next, a description will be given of a loop playback state determination process which is executed by the image processing apparatus 100 when the loop playback button 714 is pressed.

Figure 5:
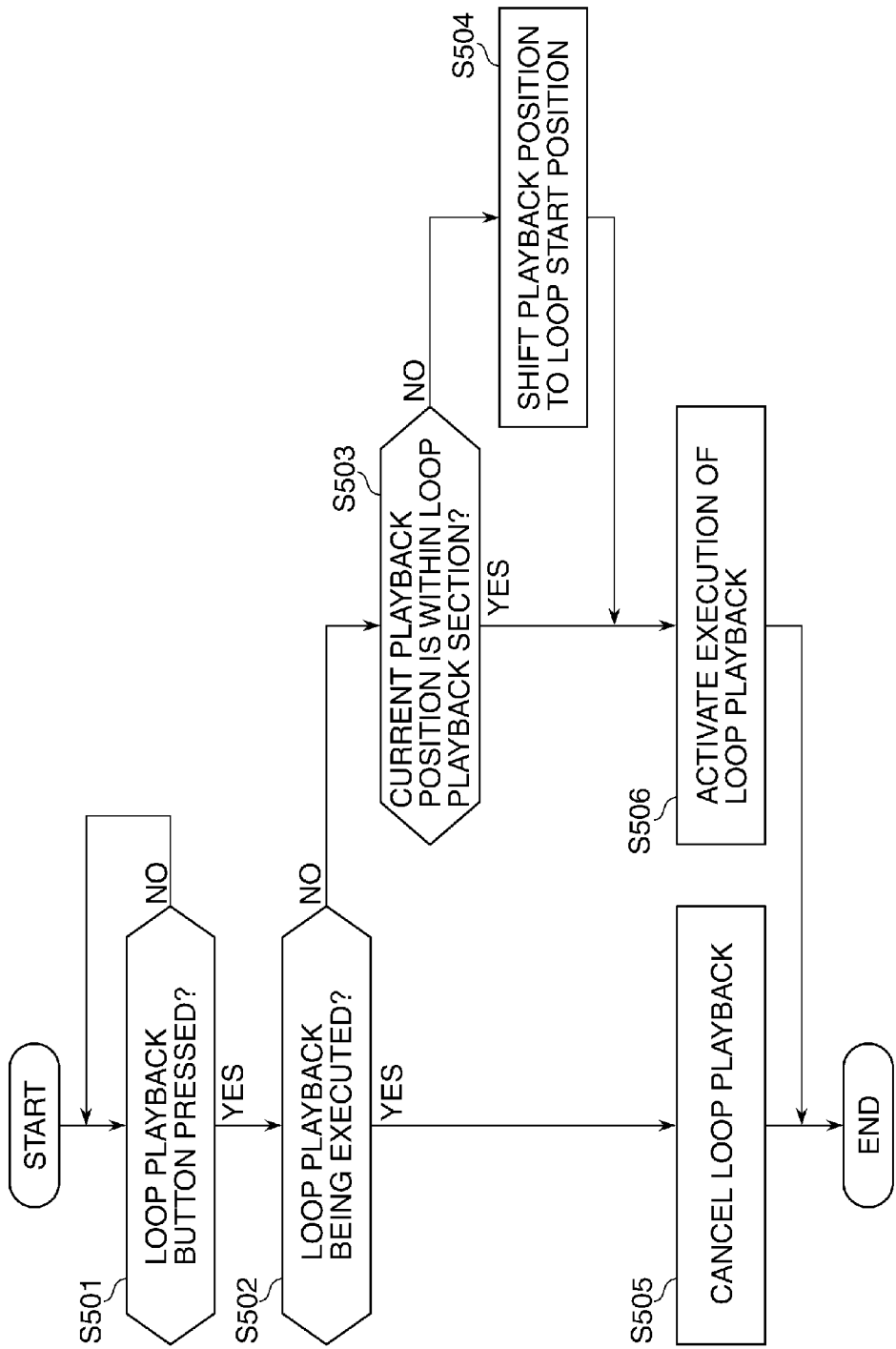
FIG. 5 is a flowchart of a loop playback state determination process according to the first embodiment.

FIG. 5 is a flowchart of the loop playback state determination process in the first embodiment. Steps appearing in FIG. 5 are realized by execution of a control program by the CPU 224 of the image processing apparatus 100.

In a step S501, the detection section 312 determines whether or not the loop playback button 714 is pressed. If it is determined that the loop playback button 714 is pressed, the detection section 312 notifies the playback controller 311 of this event. On the other hand, if it is determined that the loop playback button 714 is not pressed, the step S501 is repeatedly executed.

In a step S502, the playback controller 311 acquires information concerning a loop playback state from the management section 314, and determines whether or not the loop playback is already being executed. If it is determined that the loop playback is already being executed, the process proceeds to a step S505, wherein the playback controller 311 cancels the current execution of the loop playback and notifies the management section 314 of the cancellation. The management section 314 stores information concerning the changed loop playback state in the RAM 226 or the HDD 227.

If it is determined in the step S502 that the loop playback is not being executed, the process proceeds to a step S503, and the playback controller 311 determines whether or not the current playback position is within the loop playback section. In order to determine whether or not the current playback position is in the loop playback section, the information determined in the steps S401 to S403 in FIG. 4 is used.

If it is determined in the step S503 that the current playback position is outside the loop playback section, the process proceeds to a step S504, and the playback controller 311 shifts the current playback position to a start position of the section for loop playback. On the other hand, if it is determined that the current playback position is within the loop playback section in the step S503 or after execution of the step S504, the playback controller 311 activates execution of the loop playback, and notifies the management section 314 of the activation (step S506). The management section 314 stores information concerning the changed loop playback state in the RAM 226 or the HDD 227.

Figure 6:
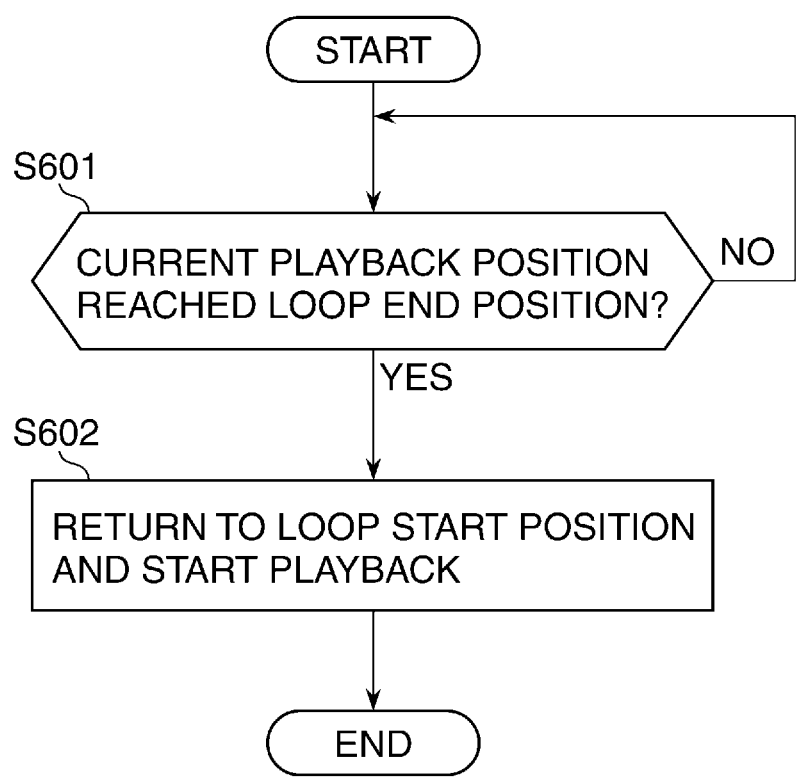
FIG. 6 is a flowchart of a loop playback process according to the first embodiment.

FIG. 6 is a flowchart of a loop playback process according in the first embodiment. Steps appearing in FIG. 6 are realized by execution of a control program by the CPU 224 of the image processing apparatus 100.

In a step S601, the detection section 312 determines whether or not the current playback position has reached the end position of the section for loop playback. If it is determined that the current playback position has not reached the end position of the section for loop playback, the process returns to the step S601. On the other hand, if it is determined that the current playback position has reached the end position of the section for loop playback, the process proceeds to a step S602, wherein the detection section 312 notifies the playback controller 311 that the current playback position has reached the end position of the section for loop playback, and shifts the current playback position back to the start position of the section for loop playback.

Figure 7:
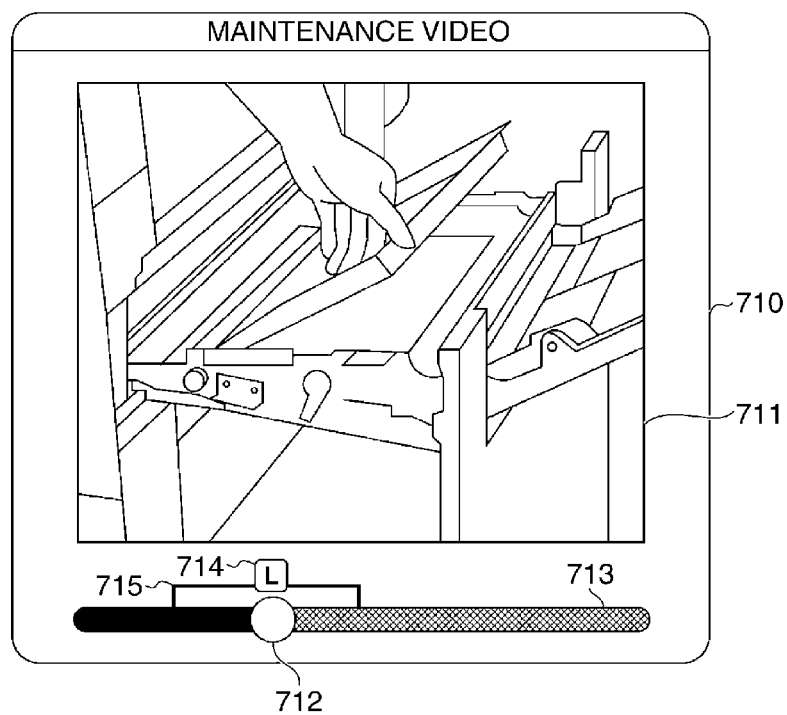
FIG. 7 is a view of an example of a maintenance video screen during loop playback in the first embodiment.

FIG. 7 is a view of an example of a maintenance video screen during loop playback in the first embodiment.

The illustrated screen is displayed on the LCD 201 of the image processing apparatus 100 or an apparatus with an equivalent display function.

A screen 710 for displaying the maintenance video during loop playback comprises a video data display section 711, a button 712 indicating the current playback position, a bar 713 representing a total playback amount, the aforementioned loop playback button 714, and a frame 715 representing a loop playback section. Note that the example illustrates the arrangement of minimum elements for executing the present embodiment, and in addition to these, there may be displayed other buttons corresponding to associated functions for use in controlling the playback.

In the video data display section 711, video data is displayed for playback by the video controller 310. The button 712 indicating the current playback position and the bar 713 representing the total playback amount are similar to those of a seek bar provided for a function of playback software for music, video, etc. For example, the bar 713 representing the total playback amount is similar to a bar of the seek bar, and the button 712 indicating the current playback position is similar to a slider in the seek bar, whereby the position of the button 712 in the bar 713 enables visual recognition of the playback position and hence the remaining playback period.

The loop playback button 714 is displayed by the step S403 in FIG. 4. The frame 715 showing the loop playback section enables the system user to visually recognize the start position and end position of the section for loop playback, based on the aforementioned information thereon which is stored in the RAM 226 or the HDD 227 in the step S403 in FIG. 4.

Although in the present embodiment, the loop playback button 714 is displayed together with the playback screen of a video, this is not limitative, but by using a button originally provided on as a hard key, the same associated processing may be performed. Further, although the loop playback is performed when the loop playback button 714 is pressed, this is not limitative, the loop playback may be executed at a time point the start position and end position of the section for loop playback are determined.

According to the first embodiment described above, in a case where it takes time to understand an instructed part of a maintenance procedure and required operations associated with the instructed part cannot be executed within an assigned time period, so that the maintenance video proceeds to a next part corresponding to a next part of the procedure, it is possible to perform loop playback of a part of the video desired to be played, only by shifting the playback position to a location as a start of the instructed part which it takes time to understand. Therefore, without repeating the action for shifting back the playback position, it is possible to execute loop playback of the instructed part of the video which it takes time to understand.

Next, an image processing apparatus according to a second embodiment of the present invention will be described. In the second embodiment, a case will be described in which a fine-adjustment is performed when shifting the current playback position backward. The image processing apparatus according to the second embodiment has the same configurations as described with reference to FIGS. 1 to 3 in the first embodiment, and the same components as those of the first embodiment are denoted by the same reference numerals and description thereof is omitted. The following description is given only of different points from the first embodiment.

First, a description will be given of a loop playback button display process for displaying the loop playback button 714 when the image processing apparatus 100 according to the second embodiment shifts a playback position of a maintenance video being played, while performing fine-adjustment of the playback position.

Figure 8:
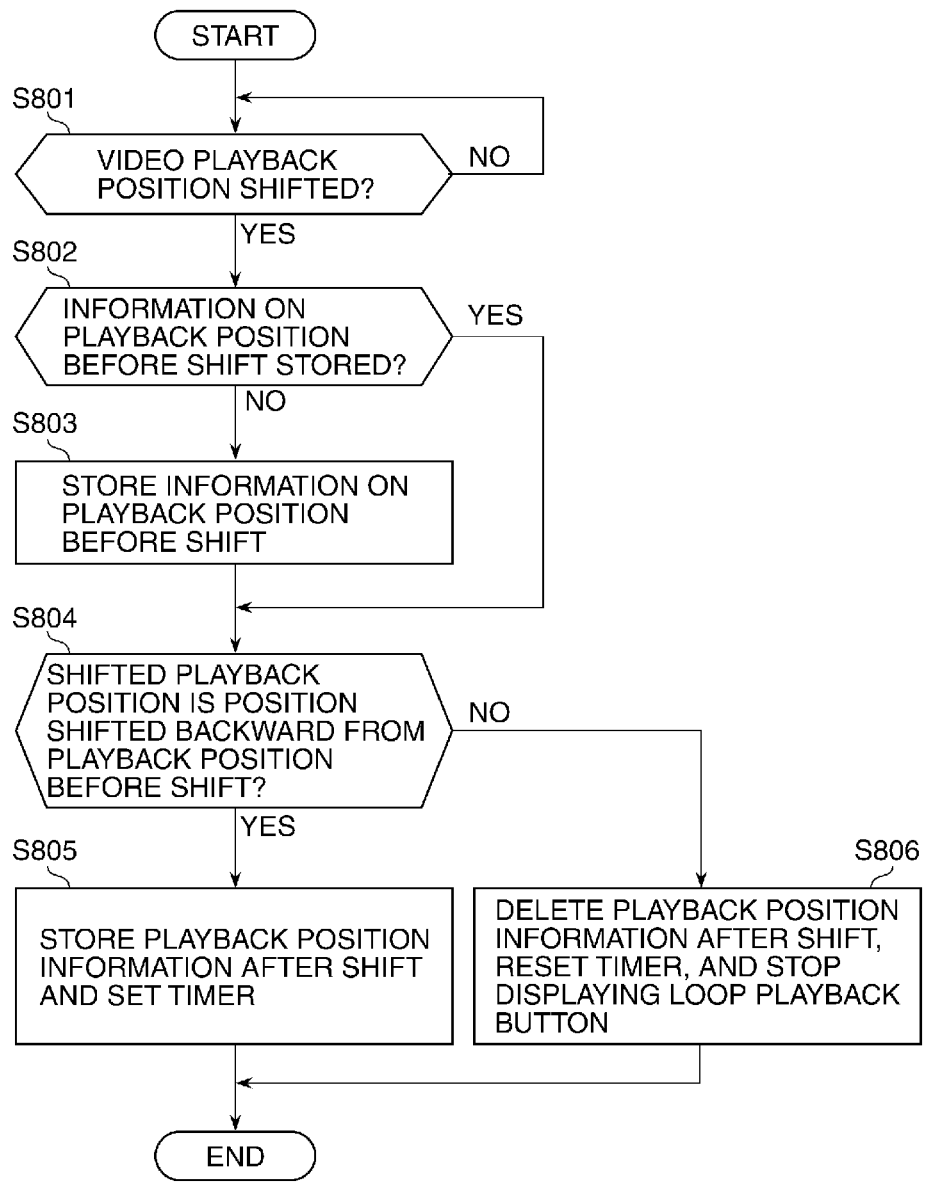
FIG. 8 is a flowchart of a loop playback button display process when a playback position of a maintenance video is shifted, which is executed by an image processing apparatus according to a second embodiment of the present invention.

FIG. 8 is a flowchart of the loop playback button display process according to the second embodiment when the playback position of the maintenance video is shifted. Steps appearing in FIG. 8 are realized by execution of a control program by the CPU 224 of the image processing apparatus 100.

A step S801 is the same as the step S401 in FIG. 4 and hence description thereof is omitted.

In a step S802, the comparative determination section 313 determines whether or not information on the playback position before the shift detected by the detection section 312 is stored. If it is determined that information on the playback position before the shift is not stored, the process proceeds to a step S803, wherein the management section 314 stores the information on the playback position before the shift in the RAM 226 or the HDD 227, and then the process proceeds to a step S804. On the other hand, if it is determined in the step S802 that information on the playback position before the shift is stored, the process directly proceeds to the step S804.

The step S804 is the same as the step S402 in FIG. 4, and hence description thereof is omitted.

If it is determined in the step S804 that the playback position after the shift is a position shifted backward from the playback position before the shift, the process proceeds to a step S805, wherein the management section 314 stores the information on the playback position after the shift in the RAM 226 or the HDD 227. Further, in the step S805, the management section 314 sets a timer. A time period set by the timer may be a value stored in the ROM 225 or the HDD 227 in advance, or may be a value input and set by the system user. Note that if the timer has been already set, the timer is reset.

Further, in the step S805, the CPU 224 waits until the set time (predetermined time period) elapses, and during the time, if the system user shifts the playback position, the process returns to the step S801.

If it is determined in the step S804 that the playback position after the shift is not a position shifted backward from the playback position before the shift, the management section 314 deletes the information on the playback position after the shift (step S806). Further, the management section 314 resets the timer if it has been set, and if the loop playback button 714 has been displayed, the management section 314 instructs the playback controller 311 to stop displaying the loop playback button 714.

Next, a description will be given of a process when the time period set by the timer in the step S805 in FIG. 8 has elapsed.

Figure 9:
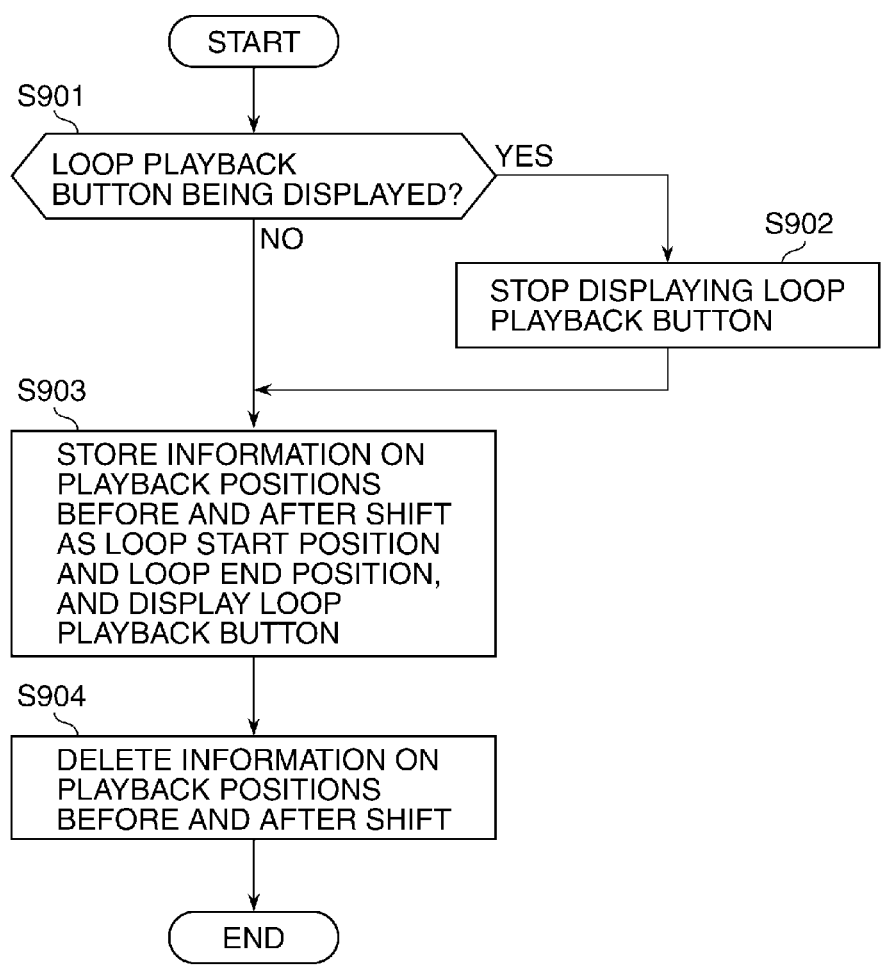
FIG. 9 is a flowchart of a process executed after the lapse of time set for a timer in a step in FIG. 8.

FIG. 9 is a flowchart of the process after the time period set by the timer in the step S805 in FIG. 8 has elapsed. Steps appearing in FIG. 9 are realized by execution of a control program by the CPU 224 of the image processing apparatus 100.

In a step S901, the playback controller 311 determines whether or not the loop playback button 714 has been displayed. If it is determined that the loop playback button 714 has not been displayed, the process proceeds to a step S903. On the other hand, if it is determined that the loop playback button 714 has been displayed, the process proceeds to a step S902, wherein the playback controller 311 stops displaying the loop playback button 714 being displayed e.g. as appearing in FIG. 7.

The step S903 is the same as the step S403 in FIG. 4, and hence description thereof is omitted.

In a step S904, the management section 314 deletes stored information on the playback position before the shift and the playback position after the shift, from the RAM 226 or the HDD 227.

According to the above second embodiment, considering a case in which after shifting the playback position, the playback position is shifted again within a predetermined time period (time period set by the timer), the loop playback button 714 is displayed in the section between the playback position after the shift and the playback position before the shift. This enables, even if the start position of playback is fine-adjusted after a shift, to display the loop playback button 714 at a fine-adjusted playback position.

Next, an image processing apparatus according to a third embodiment of the present invention will be described. In the third embodiment, a case will be described in which a section for loop playback is determined in video data divided into chapters. The image processing apparatus according to the third embodiment has the same configurations as described with reference to FIGS. 1 to 3 in the first embodiment, and the same components as those of the first embodiment are denoted by the same reference numerals and description thereof is omitted. The following description is given only of different points from the first embodiment.

Figure 10:
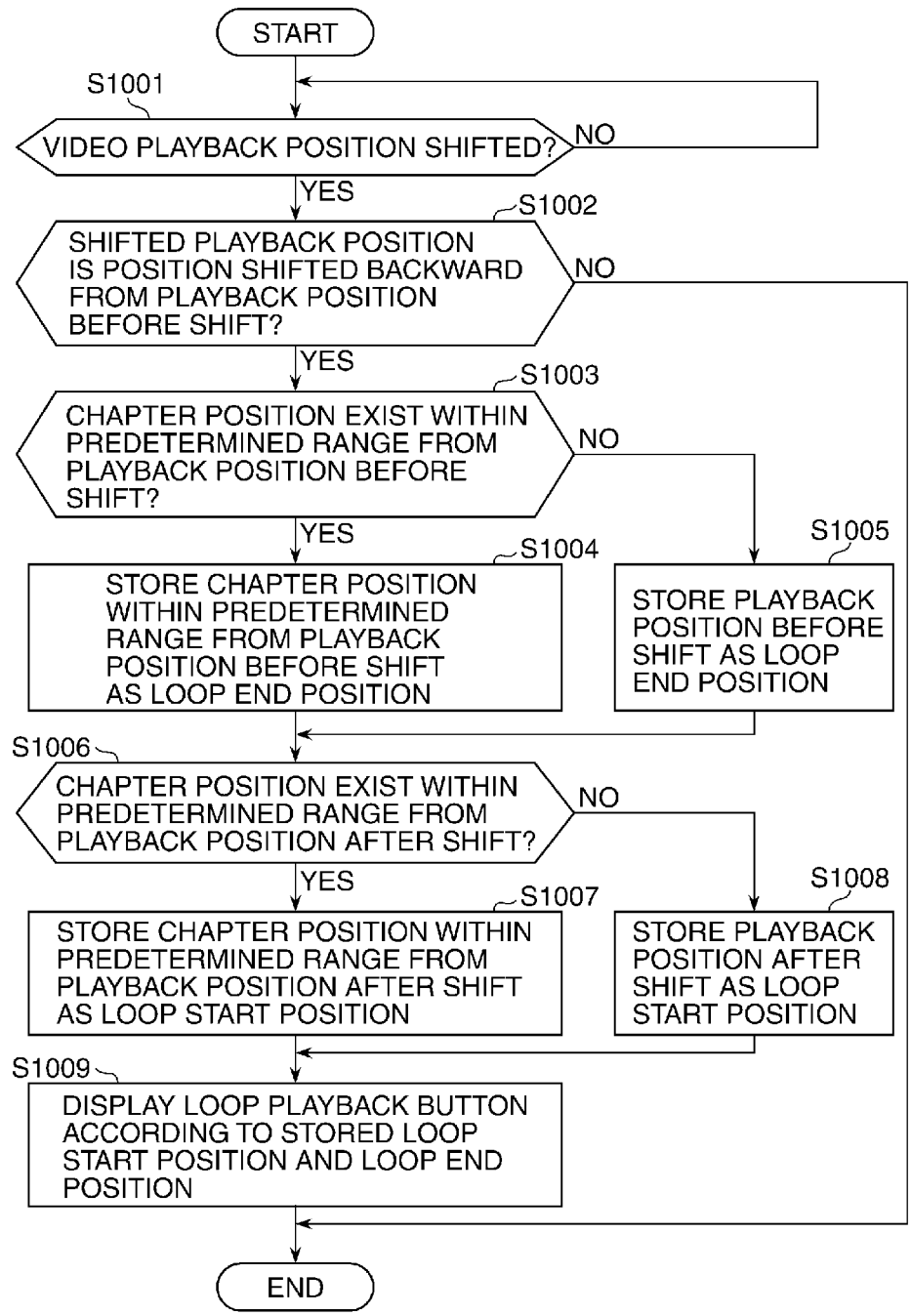
FIG. 10 is a flowchart of a process for deciding a section for loop playback in video data divided into chapters, which is executed by an image processing apparatus according to a third embodiment of the present invention.

FIG. 10 is a flowchart of a process for determining a section for loop playback in video data divided into chapters, which is executed by the image processing apparatus according to the third embodiment. Steps appearing in FIG. 10 are realized by execution of a control program by the CPU 224 of the image processing apparatus 100.

Steps S1001 and S1002 are the same as the steps S401 and S402 in FIG. 4, and hence description thereof is omitted.

In a step S1003, the comparative determination section 313 determines whether or not a chapter position exists within a predetermined range from the playback position before the shift. The predetermined range may be a value stored in the ROM 225 or the HDD 227 in advance, or it may be a value input and set by the system user.

If it is determined in the step S1003 that the chapter position exists within the predetermined range from the playback position before the shift, the process proceeds to a step S1004. In the step S1004, the management section 314 stores the chapter position existing within the predetermined range from the playback position before the shift as the end position of a section for loop playback in the RAM 226 or the HDD 227.

On the other hand, if it is determined in the step S1003 that the chapter position does not exist within the predetermined range from the playback position before the shift, the process proceeds to a step S1005. In the step S1005, the management section 314 stores the playback position before the shift as the end position of a section for loop playback in the RAM 226 or the HDD 227.

In a step S1006, the comparative determination section 313 determines whether or not the chapter position exists within a predetermined range from the playback position after the shift. The predetermined range may be a value stored on the ROM 225 or the HDD 227 in advance, or it may be a value input and set by the system user. Further, it may be the same as "the predetermined range" described in the step S1003, or it may be different from it.

If it is determined in the step S1006 that the chapter position exists within the predetermined range from the playback position after the shift, the process proceeds to a step S1007. In the step S1007, the management section 314 stores the chapter position existing within the predetermined range from the playback position after the shift as the start position of the section for the loop playback in the RAM 226 or the HDD 227.

On the other hand, if it is determined in the step S1006 that the chapter position does not exist within the predetermined range from the playback position after the shift, the process proceeds to a step S1008. In the step S1008, the management section 314 stores the playback position after the shift as the start position of the section for loop playback in the RAM 226 or the HDD 227.

In a step S1009, the playback controller 311 displays the loop playback button 714 according to information on the start position and end position of the section for loop playback stored in the above processes.

According to the above third embodiment, in the case where the maintenance video is video data divided into chapters, it is possible to set the start position and end position of the section for loop playback according to chapter positions. Therefore, the fine-adjusting is not necessary, and it is possible to easily determine the start position and end position of the section for loop playback.

Next, an image processing apparatus according to a fourth embodiment of the present invention will be described. In the fourth embodiment, a case will be described in which average values are determined for a section for loop playback. The image processing apparatus according to the fourth embodiment has the same configurations as described with reference to FIGS. 1 to 3 in the first embodiment, and the same components as those of the first embodiment are denoted by the same reference numerals and description thereof is omitted. The following description is given only of different points from the first embodiment.

Figure 11:
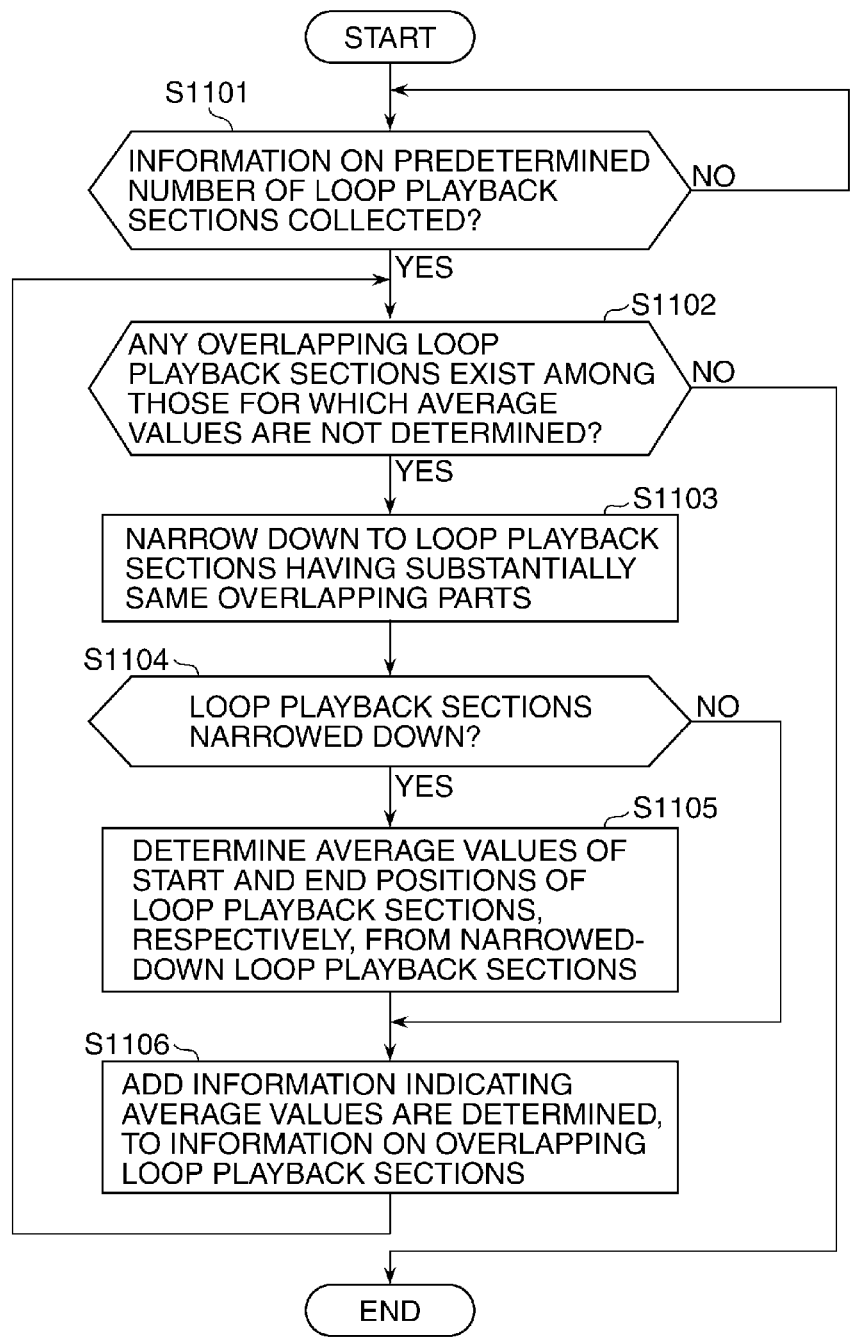
FIG. 11 is a flowchart of a process for determining respective average values of start positions and end positions of sections for loop playback, which is executed by an image processing apparatus according to a fourth embodiment of the present invention.

FIG. 11 is a flowchart of a process for determining respective average values of the start position and end position of sections for loop playback, which is executed by the image processing apparatus 100 according to the fourth embodiment based on information on the sections for loop playback stored therein. Here, information on a loop playback section includes the start position of a section for loop playback, the end positions of the section for loop playback, information for identifying video data, etc. Information for identifying video data may be a file name of the video data, an ID assigned to the video data in advance, or any suitable information, insofar as it enables identification of video data for which is provided information on the start position and end position of a section for loop playback. Further, Steps appearing in FIG. 11 are realized by execution of a control program by the CPU 224 of the image processing apparatus 100.

In a step S1101, the comparative determination section 313 determines whether or not information on a predetermined number of loop playback sections has been collected, based on the start positions and end positions of sections for loop playback which are stored in the step S403 in FIG. 4 and the information for identifying video data. If it is determined that information on the predetermined number of the loop playback sections has not been collected, the process returns to the step S1101. The predetermined number may be a value stored on the ROM 225 or the HDD 227 in advance, or may be a value input and set by the system user.

If it is determined in the step S1101 that information on the predetermined number of loop playback sections has been collected, the process proceeds to a step S1102, wherein the comparative determination section 313 determines from information on loop playback sections for which average values have not been determined, whether or not there is information on loop playback sections indicating overlapping of loop playback sections. If it is determined from the information on loop playback sections for which average values have not been determined, that there is no information on loop playback sections indicating overlapping of loop playback sections, the present process is immediately terminated. The information on loop playback sections for which average values have not been determined is intended to mean information on loop playback sections to which no information indicating execution of processing for determining the average value, which will be described hereinafter, has not been added.

If it is determined from the information on the loop playback sections for which average values are not determined, in the step S1102 that that there is information on the loop playback sections indicating overlapping of loop playback sections, the process proceeds to a step S1103, wherein the comparative determination section 313 further narrows down the information on the loop playback sections indicating overlapping of loop playback sections to information on loop playback sections which are substantially same. For example, it is determined whether or not the start positions and end positions of loop playback sections fall within respective predetermined ranges, to thereby narrow down the information on the loop playback sections. The predetermined ranges may be values stored on the ROM 225 or the HDD 227 in advance, or may be values input and set by the system user in advance, or may be determined from information on the loop playback sections.

In a step S1104, the comparative determination section 313 determines whether or not the information on the loop playback sections has been narrowed down in the step S1103. Specifically, it determined whether or not there is more than one piece of information on overlapping loop playback sections. If it is determined that the information on the loop playback sections has not been narrowed down, the process proceeds to a step S1106. On the other hand, if it is determined in the step S1104 that the information on the loop playback sections has been narrowed down, the process proceeds to a step S1105, wherein the management section 314 determines average values of the start position and end position of a loop playback section from the narrowed down information on the loop playback sections.

In the step S1106, the management section 314 adds information indicating that the process for determining average values has been executed to the information on the overlapping loop playback sections, and the process returns to the step S1102.

The loop playback button 714 may be displayed, before starting loop playback, by referring to the information on the average values of the start position and end position of a loop playback section. Further, the loop playback button 714 may be displayed when the playback position of the video has passed the average value of the end position of the loop playback section. Further, although the description of the present embodiment is given assuming that the above-described process is executed by the image processing apparatus 100, the process might be executed by the server 121.

According to the above-described fourth embodiment, in a case where the average positions of the start positions and end positions of loop playback sections for are stored, the loop playback button 714 can be displayed beforehand. Parts of maintenance video which it takes time to understand procedures of operations therefor are similar between system users. Therefore, it is possible to provide a user who operates the image processing apparatus for the first time with the loop playback button 714 without executing actions for shifting the playback position in the maintenance video.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2011-285964 filed Dec. 27, 2011, which is hereby incorporated by reference herein in its entirety.

What is claimed is:

1. An image processing apparatus capable of playing a video comprising:
    a shift unit configured to shift a playback position of the video to a desired position according to an operation by a user;
    a determination unit configured to determine whether or not a playback position after being shifted by said shift unit is a position shifted backward from the playback position before being shifted;
    a display control unit configured to control to display an operation button, in a case where said determination unit determines that the shifted playback position is the position shifted backward from the playback position before being shifted, while controlling not to display the operation button in a case where said determination unit determines that the shifted playback position is not the position shifted backward from the playback position before being shifted, wherein the operation button is a button for instructing a loop playback of a predetermined loop playback section; and
    a loop playback unit configured to execute, when the operation button is depressed, the loop playback of the predetermined loop playback section.

2. An image processing apparatus capable of playing a video comprising:
    a shift unit configured to shift a playback position of the video to a desired position according to an operation by a user;
    a determination unit configured to determine whether or not a playback position after being shifted by said shift unit is a position shifted backward from the playback position before being shifted;
    an operation unit configured to, when said determination unit determines that the playback position after being shifted is a position shifted backward from the playback position before being shifted, store the playback position after being shifted as a start position of a loop playback section, store the playback position before being shifted as an end position of the loop playback section, and give an instruction for controlling loop playback of the loop playback section defined by the start position and the end position;
    a comparison determination unit configured to, when the number of loop playback sections determined between stored start positions and stored end positions, respectively, is equal to a predetermined number, to determine whether or not there are overlapping loop sections;
    a narrowing-down unit configured to, when said comparison determination unit determines that there are a plurality of overlapping loop sections, narrowing the overlapping loop playback sections down to loop playback sections which have substantially the same overlapping part; and a management unit configured to determine respective average values of the start position and the end position from the loop playback sections narrowed down by said narrowing-down unit, wherein said operation unit sets an average value of the start position determined by said management unit as a start position of the loop playback section, sets an average value of the end position determined by said management unit as an end position of the loop playback section, and give the instruction for controlling loop playback of the loop playback section defined by the start position and the end position.

3. The image processing apparatus according to claim 1, further comprising:

a waiting unit configured to, when said determination unit determines that the playback position after being shifted is a position shifted backward from the playback position before being shifted, wait for a predetermined time period to elapse; and wherein said display control unit controls to display the operation button, when the playback position is not shifted by said shift unit before elapse of the predetermined time period.

4. The image processing apparatus according to claim 1, further comprising a storing unit configured to, when said determination unit determines that the playback position after being shifted is a position shifted backward from the playback position before being shifted, store a chapter position within a predetermined range from the playback position before being shifted as an end position of a loop playback section, and a chapter position within a predetermined range from the playback position after being shifted as a start position of the loop playback section, wherein said playback unit executes a loop playback of the loop playback section defined by the chapter positions stored as the start position and the end position, respectively, by said storing unit.

5. A method of controlling an image processing apparatus including a playback unit for playing a video, and a shift unit for shifting a playback position of the video to a desired position according to an operation by a user, comprising:

a determining step of determining whether or not a playback position after being shifted by the shift unit is a position shifted backward from the playback position before being shifted; and a display control step of controlling to display an operation button, in a case where said determining step determines that the shifted playback position is the position shifted backward from the playback position before being shifted, while controlling not to display the operation button in a case where said determining step determines that the shifted playback position is not the position shifted backward from the playback position before being shifted, wherein the operation button is a button for instructing a loop playback of a predetermined loop playback section and a loop playback step of executing, when the operation button is depressed the loop playback of the predetermined loop playback section.

6. A non-transitory computer-readable storage medium storing a computer-executable program causing a computer provided in an image processing apparatus including a playback unit for playing a video, and a shift unit for shifting a playback position of the video to a desired position according to an operation by a user, to execute a method of controlling the image processing apparatus, wherein the method comprises:

a determining step of determining whether or not a playback position after being shifted by the shift unit is a position shifted backward from the playback position before being shifted; and a display control step of controlling to display an operation button, in a case where said determining step determines that the shifted playback position is the position shifted backward from the playback position before being shifted, while controlling not to display the operation button in a case where said determining step determines that the shifted playback position is not the position shifted backward from the playback position before being shifted, wherein the operation button is a button for instructing a loop playback of a predetermined loop playback section; and a loop playback step of executing, when the operation button is depressed the loop playback of the predetermined loop playback section.

7. The image processing apparatus according to claim 1, further comprising:

a storing unit configured to store the playback position after being shifted by said shift unit as a start position of a loop playback section and to store the playback position before being shifted as an end position of the loop playback section, wherein said loop playback unit executes a loop playback of the loop playback section defined by the stored start position and the stored end position.

8. The image processing apparatus according to claim 3, wherein said determination unit makes the determination again when the playback position is shifted by said shift unit before the elapse of the predetermined time period.

9. The image processing apparatus according to claim 4, wherein said storing unit stores the playback position before being shifted as the end position of the loop playback section when the chapter position out of the predetermined range from the playback position before being shifted.

10. The image processing apparatus according to claim 4, wherein said storing unit stores the playback position after being shifted as the start position of the loop playback section when the chapter position out of the predetermined range from the playback position after being shifted.

11. The image processing apparatus according to claim 1, further comprising:

a jam detection unit configured to detect an occurrence of jam, wherein the video shows a maintenance procedure for removing the jam detected by said jam detection unit.

12. The image processing apparatus according to claim 1, further comprising:

a consumable detection unit configured to detect a consumable shortage, wherein the video shows a maintenance procedure for resolving the consumable shortage detected by said consumable detection unit.

13. A method of controlling an image processing apparatus including a playback unit for playing a video, and a shift unit for shifting a playback position of the video to a desired position according to an operation by a user, comprising:

a determining step of determining whether or not a playback position after being shifted by the shift unit is a position shifted backward from the playback position before being shifted;

a storing step of storing the playback position after being shifted as a start position of a loop playback section, storing the playback position before being shifted as an end position of the loop playback section, and giving an instruction for controlling loop playback of the loop playback section defined by the start position and the end position, when said determining step determines that the playback position after being shifted is a position shifted backward from the playback position before being shifted;

a comparing step of, when the number of loop playback sections determined between stored start positions and stored end positions, respectively, is equal to a predetermined number, to determine whether or not there are overlapping loop sections;

a narrowing-down step of, when said comparing step determines that there are a plurality of overlapping loop sections, narrowing the overlapping loop playback sections down to loop playback sections which have substantially the same overlapping part; and a management step of determining respective average values of the start position and the end position from the loop playback sections narrowed down by said narrowing-down step; and a setting step of setting an average value of the start position determined by said management unit as a start position of the loop playback section, sets an average value of the end position determined by said management step as an end position of the loop playback section, and giving the instruction for controlling loop playback of the loop playback section defined by the start position and the end position.

14. A non-transitory computer-readable storage medium storing a computer-executable program causing a computer provided in an image processing apparatus including a playback unit for playing a video, and a shift unit for shifting a playback position of the video to a desired position according to an operation by a user, to execute a method of controlling the image processing apparatus, wherein the method comprises:

a determining step of determining whether or not a playback position after being shifted by the shift unit is a position shifted backward from the playback position before being shifted;

a storing step of storing the playback position after being shifted as a start position of a loop playback section, storing the playback position before being shifted as an end position of the loop playback section, and giving an instruction for controlling loop playback of the loop playback section defined by the start position and the end position, when said determining step determines that the playback position after being shifted is a position shifted backward from the playback position before being shifted;

a comparing step of, when the number of loop playback sections determined between stored start positions and stored end positions, respectively, is equal to a predetermined number, to determine whether or not there are overlapping loop sections;

a narrowing-down step of, when said comparing step determines that there are a plurality of overlapping loop sections, narrowing the overlapping loop playback sections down to loop playback sections which have substantially the same overlapping part; and a management step of determining respective average values of the start position and the end position from the loop playback sections narrowed down by said narrowing-down step; and a setting step of setting an average value of the start position determined by said management unit as a start position of the loop playback section, sets an average value of the end position determined by said management step as an end position of the loop playback section, and giving the instruction for controlling loop playback of the loop playback section defined by the start position and the end position.

* * * * *